(12) United States Patent
Geoffroy (10) Patent No.: US 11,565,590 B2
(45) Date of Patent: Jan. 31, 2023

(54) RAPID DESCENT DEVICE FOR A PANTOGRAPH

(71) Applicant: Faiveley Transport Tours, Saint-Pierre-des-Corps (FR)

(72) Inventor: Philippe Geoffroy, Ballan Mire (FR)

(73) Assignee: FAIVELEY TRANSPORT TOURS, Saint-Pierre-des-Corps (FR)

( * ) Notice: Subject to any disclaimer, the term of this patent is extended or adjusted under 35 U.S.C. 154(b) by 307 days.

(21) Appl. No.: 17/067,966

(22) Filed: Oct. 12, 2020

(65) Prior Publication Data

US 2021/0122245 A1   Apr. 29, 2021

(30) Foreign Application Priority Data

Oct. 24, 2019 (FR) ...................................... 1911918

(51) Int. Cl.
*B60L 5/32* (2006.01)
*B60L 5/20* (2006.01)
*B60L 5/16* (2006.01)
*B60L 5/28* (2006.01)

(52) U.S. Cl.
CPC ......... *B60L 5/32* (2013.01); *B60L 5/16* (2013.01); *B60L 5/20* (2013.01); *B60L 5/28* (2013.01); *B60L 2200/26* (2013.01)

(58) Field of Classification Search
CPC ...... B60L 3/00; B60L 3/04; B60L 3/12; B60L 5/12; B60L 5/16; B60L 5/20; B60L 5/24; B60L 5/26; B60L 5/28; B60L 5/32; B60L 2200/26

See application file for complete search history.

(56) References Cited

U.S. PATENT DOCUMENTS

| 1,222,479 A * | 4/1917 | Simmon ................... B60L 5/32 191/65 |
| 2018/0170339 A1* | 6/2018 | Plechey .................. B60T 17/04 |
| 2019/0202295 A1* | 7/2019 | Engström ................ B60L 5/36 |

FOREIGN PATENT DOCUMENTS

| CN | 202345420 U * | 7/2012 | ............... B60L 5/14 |
| EP | 0388805 A2 | 9/1990 | |
| GB | 1374972 A * | 11/1974 | ............... B60L 5/14 |
| WO | WO-2015112174 A1 * | 7/2015 | ............... B60L 5/16 |

(Continued)

OTHER PUBLICATIONS

Examination Report dated Oct. 25, 2022 for corresponding Indian Patent Application No. 202014044371 (6 pages).

*Primary Examiner* — Zachary L Kuhfuss
*Assistant Examiner* — Cheng Lin
(74) *Attorney, Agent, or Firm* — The Small Patent Law Group LLC; Philip S. Hof (57) ABSTRACT

This rapid descent device comprises a valve comprising two chambers, at least one rub strip fastened to the body of the current-collector bow of the pantograph, intended to come into contact with the overhead wire and equipped with degradation detection circuit, at least one supply line of fluid to the main chamber of the valve, at least one feed line intended to feed this fluid to the pilot chamber of the valve, as well as at least one detection line extending from the pilot chamber of the valve, to feed a respective detection circuit. The rapid descent device comprises means for temporary shut out of the feeding of fluid of the main chamber, which reliably ensures the initial raising of the pantograph until the pantograph comes into contact with the overhead wire.

20 Claims, 4 Drawing Sheets

(56) References Cited

FOREIGN PATENT DOCUMENTS

| | | | |
|---|---|---|---|
| WO | WO-2016020300 A1 * | 2/2016 | ................ B60L 5/16 |
| WO | 2019158846 A1 | 8/2019 | |

* cited by examiner

RAPID DESCENT DEVICE FOR A PANTOGRAPH

CROSS-REFERENCE TO RELATED APPLICATIONS

This application claims priority to French patent application 1911918, which was filed on 24 Oct. 2019, and the entire disclosure of which is incorporated by reference.

BACKGROUND

Technical Field

The inventive subject matter described herein relates to the field of pantographs, in particular for railroad vehicles. It firstly concerns a rapid descent device, intended to equip a pantograph, as well as a pantograph equipped with such a rapid descent device. It likewise concerns a method of implementation of such a pantograph, as well as a method of improving such a pantograph by means of this rapid descent device.

Discussion of Art

Traditionally, a pantograph firstly comprises a chassis allowing the pantograph to be fastened to the body of a vehicle, in particular a railroad vehicle. This chassis supports an articulated arm, the upper end of which receives a current-collector bow intended to come into contact with the overhead supply line. This pantograph, as a consequence, ensures the electrical contact between the traction unit, for example the locomotive, and the aforementioned overhead line.

It is assumed that with ongoing implementation of the vehicle, the electrical contact will have a tendency to provoke wear of the mechanical components that are in mutual contact with one another. It is also assumed that it is of primary importance to avoid wear of the overhead line, during such a contact. As a consequence, it is known to supply the pantograph with at least one rub strip, which is fastened onto the current-collector bow so as to come into the contact with the overhead line. This rub strip, which is made of a conducting material that is harder than the one making up the overhead line, therefore allows for the electrical current to be collected from this overhead line without as such damaging the latter.

This rub strip is traditionally integrated into a so-called rapid descent device, as referred to in the invention. With this in mind, this strip is provided with a circuit, allowing the detection of the degradation of this strip. This detection circuit is fed by means of a fluid, which is traditionally compressed air. A valve is moreover provided, comprising a main chamber and a pilot chamber separated by a membrane, in which a calibrated hole is made.

During operation, this valve has multiple functions. Firstly, the valve intervenes in the phase of initial raising of the pantograph, going from a lowered position against the body of the vehicle towards a raised position in contact with the overhead line. During this raising phase, a pneumatic unit, located in the body of the vehicle, supplies compressed air to a deployment element of the articulated arm, which is typically a cushion. The supply line, linking this unit and this cushion, possesses a by-pass allowing the feeding of the main chamber of the valve. During this phase, the compressed air is admitted into the main chamber, then passes through the calibrated hole of the membrane. This air then feeds the pilot chamber of the valve, then the circuits for detection of degradation of the rub strips via the detection line.

Lacking the detection of damage, the pressure in the pilot chamber is applied to a face of the membrane, the surface of which is greater than that of the opposite face upon which the pressure of the main chamber is applied. It results that the strain applied on the membrane, in the pilot chamber, is greater than that applied to the membrane in the main chamber. The membrane, as a consequence, plugs the outlet of the main chamber, which is in the open air. In the case where there is a leak at a degradation detection circuit of a rub strip, corresponding to critical wear of the rub strip, the pressure in the pilot chamber of the valve diminishes suddenly, in a way to reach a value approaching atmospheric pressure.

As a consequence, a significant difference in pressure is established between this pilot chamber and the main chamber, which induces a resulting strain tending to deform the membrane that does not plug the outlet of the main chamber. The main chamber being connected to the deployment cushion, the deployment cushion is then itself also brought to atmospheric pressure, which provokes a substantially immediate descent of the pantograph. As a consequence, any risk of damage of the overhead line is precluded.

The use of the valve, as described here above, in theory, presents important advantages. Indeed, at least in normal operation, this valve is able to fulfill multiple distinct functions while at the same time benefitting from a simple structure and, as a consequence, of a reduced cost price. However, in practice, this valve is subject to certain dysfunctions, which are mostly of a random type.

In particular, it has been noted that it does not always ensure the function of the initial raising of the articulated arm, which permits the placement of the pantograph in contact with the overhead line. This occurrence is particularly detrimental to the proper function of the rail network. Indeed, it implies a stoppage of the train, accompanied by a delay which may occur as a consequence.

BRIEF SUMMARY

Taking the above into account, the inventive subject matter tends to overcome at least some of the disadvantages of the prior art presented here above.

The inventive subject matter aims to propose a rapid descent device for pantographs which is able to fulfill the different functions that are assigned to the inventive subject matter.

The inventive subject matter aims, in particular, to propose such a device that ensures, in a particularly reliable manner, the raising of the articulated arm in such a way as to put the pantograph in electrical contact with the overhead line.

The inventive subject matter likewise aims to propose such a device, the mechanical structure of which is not significantly more complex than those of preceding devices, in such a way as to maintain a reasonable cost price.

Lastly, the inventive subject matter aims to propose such a device that can be installed on an original equipment pantograph, or which can alternatively be substituted for a rapid descent device that is already in place on an operational pantograph.

At least one of the aforementioned aims is achieved through the intermediary of a first subject matter of the inventive subject matter, which is a rapid descent device (1; 1'; 1"; 1''') for pantograph (210). The pantograph comprising a chassis (212), a current-collector bow (214) intended to be placed against an overhead line (209), an articulated arm (216) linking this current-collector bow to the chassis, means of deployment (218) of the articulated arm put into communication with means of supply (206), belonging to a railroad vehicle (200) equipped with this pantograph, these means of supply being able to supply a compressed fluid, in particular compressed air.

The rapid descent device comprising:
- a valve (20) comprising two chambers (22, 24), which are separated by a membrane (25), the first chamber being the so-called pilot chamber (22) comprising a pilot aperture (27) of the valve, the second chamber being the so-called main chamber (24) comprising an inlet aperture (21) and an outlet aperture (50), the said outlet aperture allowing the evacuation of the fluid to the atmosphere, this membrane possessing a first operational position, or closed position, in which the membrane plugs the outlet aperture, as well as a second operational position, or open position, in which it does not plug the outlet aperture,
- at least one rub strip (10, 12) able to be fastened to the body of the current-collector bow, this rub strip being intended to come into contact with the overhead line and being equipped with a degradation detection circuit (11, 13), able to be supplied by the said fluid,
- at least one supply line (44) intended to supply fluid to the main chamber through an inlet aperture of the at least one supply line, every supply line being put into communication by the fluid with the supply means,
- at least one feeder line (30, 32) intended to feed fluid to the pilot chamber, each feeder line being put into communication by the fluid with the supply means,
- at least one detection line (14) that extends from the pilot chamber (22) of the valve, to feed a respective degradation detection circuit of the rub strips (10, 12), this rapid descent device being characterized in that the device comprises means (40) for temporary shut out of the feed of fluid to the main chamber.

According to other features of this rapid descent device:
- these means of temporary shut out are placed between the main chamber and the means of supply;
- the said membrane (25) of the valve (20) has no aperture;
- the means of temporary shut out are means (40) of temporary closure of the supply line (44);
- this device comprises provisional fluid feed means (40) of the pilot chamber (22), these provisional feed means being provisional opening means (40) of a so-called provisional feed line (32), linking these provisional opening means (40) and the pilot aperture of the valve;
- this device comprises a so-called branch feed line (30) leading to the pilot aperture of the valve, this branch feed line being put in communication by the fluid with the means of supply, this branch line possessing a restriction (34) the cross-section of which is lesser than the cross-section of the detection line (14);
- the means of temporary closure and provisional opening comprise a main distributor (40) linking the means of supply (206), either to the provisional feed line (32) in a first distribution position, known as temporary, or to the supply line (44) in a second distribution position, known as nominal;
- this device comprises first means of temporal shift (60, 60", 62, 64), which are able to shift the passage of the main distributor from a temporary distribution position to a nominal distribution position of the main distributor, in relation to the occurrence of an event that is representative of the deployment of the pantograph;
- the event that is representative of the deployment of the pantograph is the moment in which the means of supply start to supply fluid;
- the event that is representative of the deployment of the pantograph is the moment in which the pantograph leaves a low position;
- this device comprises second means of temporal shift (60, 60", 62, 64), which are able to shift the passage of the main distributor from a nominal distribution position to a temporary distribution position, in relation to the occurrence of an event that is representative of the retraction of the pantograph;
- the event that is representative of the retraction of the pantograph is the moment in which the rub strip is placed in atmospheric pressure;
- the event that is representative of the retraction of the pantograph is the moment in which the pantograph regains a low position;
- the first means of temporal shift are in common with the second means of temporal shift;
- the common means of temporal shift comprise:
- a reserve chamber (60),
- a reserve line (62) linked to the means of supply and feeding this reserve chamber, this reserve line possessing a restriction in cross-section (64),
- as well as a control means able to position the main distributor in a temporary position when the pressure in the reserve chamber is lesser than a first set value, this control means moreover being able to position the main distributor in a nominal position when the pressure in the reserve chamber is greater than a second set value;
- the control means comprise a main control line (54'") linking the reserve chamber to the control entrance of the main distributor;
- the control means moreover comprise an intermediary distributor (52), with the main control line extending from an outlet of this intermediate distributor, this intermediate distributor comprising an intermediate control line (56) extending from the reserve chamber (60);
- the first means of temporal shift and/or the second means of temporal shift comprise a retarder (60") able to control the main distributor.

A second subject matter of the inventive subject matter is a pantograph (210) comprising a chassis (212), a current-collector bow (214) intended to be placed against an overhead line (209), an articulated arm (216) linking the current-collector bow to the chassis, means of deployment (218) of the articulated arm put into communication with means of supply (206), belonging to a railroad vehicle (200) equipped with this pantograph, these means of supply being able to supply compressed fluid, in particular compressed air, this pantograph moreover comprising a rapid descent device as mentioned here above.

A third subject matter of the inventive subject matter is a method of implementation of a pantograph as here above, in which the means of temporary shut out are placed in an active configuration known as shut out configuration, in such a way as to deploy the articulated arm and to put each rub strip in contact with the overhead line, the means of temporary shut out are then passed into an inactive configuration known as supply configuration, subsequent to the occurrence of an event that is representative of the deployment of the pantograph.

According to other features of this implementation method:
- the event that is representative of the deployment of the pantograph is the moment in which the means of supply start to supply fluid;
- the event that is representative of the deployment of the pantograph is the moment in which the pantograph leaves a low position;
- the temporary shut out means are placed in an active configuration, subsequent to the occurrence of an event that is representative of the retraction of the pantograph;
- the event that is representative of the retraction of the pantograph is the moment in which the rub strip is placed under atmospheric pressure;
- the event that is representative of the retraction of the pantograph is the moment in which the pantograph regains a low position.

A fourth subject matter of the inventive subject matter is a method of improvement of a pantograph comprising a chassis (212), a current-collector bow (214) intended to be placed against an overhead line (209), an articulated arm (216) linking the current-collector bow to the chassis, means of deployment (218) of the articulated arm being put into communication with means of supply (206), belonging to a railroad vehicle (200) equipped with this pantograph, these means of supply being able to supply a compressed fluid, in particular, compressed air.

A method in which a rapid descent device, as seen here above, has been installed.

According to an advantageous feature of the inventive subject matter, in the case in which the existing pantograph is equipped with an existing rapid descent device, in used state, this existing device is replaced by the rapid descent device as seen here above.

A fifth subject matter of the inventive subject matter is a railroad vehicle (200) comprising a roof (204), as well as a pantograph (210) as seen here above, the chassis (212) of the pantograph being fastened to the roof of the railroad vehicle.

A sixth subject matter of the inventive subject matter is a valve for a rapid descent device of a pantograph, this valve comprising a housing delimitating two chambers, a first inlet of fluid flowing into the first chamber and a second inlet of fluid flowing into the second chamber, the cross-section of the first inlet being lesser than the cross-section of the second inlet, this valve moreover comprising a membrane separating these chambers, this membrane possessing a first operational position, in which it rests against its seat, as well as a second operation position in which the membrane is detached from a seat, the valve moreover comprising means of evacuation of fluid to the atmosphere, characterized in that the membrane does not have an aperture.

It goes to the merit of the applicant to have identified the shortcoming, linked to the implementation of the aforementioned prior art. In substance, the applicant has brought to light that according to the state of the art, random dysfunctions of the valve substantially originate from the fact that the position of the membrane is unstable during the theoretical raising phase of the pantograph. In particular, this membrane has the tendency to peel off from the seat, which is placed at the outlet of the main chamber. This phenomenon is more or less accentuated, in particular based upon the outside temperature, upon the wear of the membrane or even upon the clogging of the calibrated hole supplied in this membrane. When this effect is overly significant, the quantity of air escaping from the valve becomes too large.

As a consequence, the quantity of air passing through the calibrated hole of the membrane is not sufficient, in such a way as to increase the pressure in the pilot chamber in view of newly pinning the membrane on the aforementioned seat. As a consequence, both the rub strips as well as the deployment cushion are put at a clearly lower pressure, than that required to ensure the proper raise of the pantograph. This leads to major dysfunction, since this pantograph cannot fulfill its main function of pick-up of electric current, which implies the stoppage of the train.

On the contrary, the inventive subject matter provides means which permit the temporary shut out of the feed of fluid to the main chamber of the valve. Given that the main chamber is not fed fluid, the fluid admitted in the deployment cushion cannot escape by the valve. Under these conditions, this deployment cushion is then fed compressed fluid at an appropriate pressure, for a proper raising of the pantograph.

It will be noted that this means of shut out is of a temporary nature, which is to say that they can be deactivated so that the valve can fulfill all the functions assigned to it. In particular, once the main chamber is once again fed compressed fluid, the operation of the rapid descent device according to the invention is substantially the same as that of the prior art devices.

BRIEF DESCRIPTION OF THE DRAWINGS

The inventive subject matter will be described here below with reference to the attached drawings, given exclusively by way of non-limiting examples, where.

DETAILED DESCRIPTION

Figure 1:
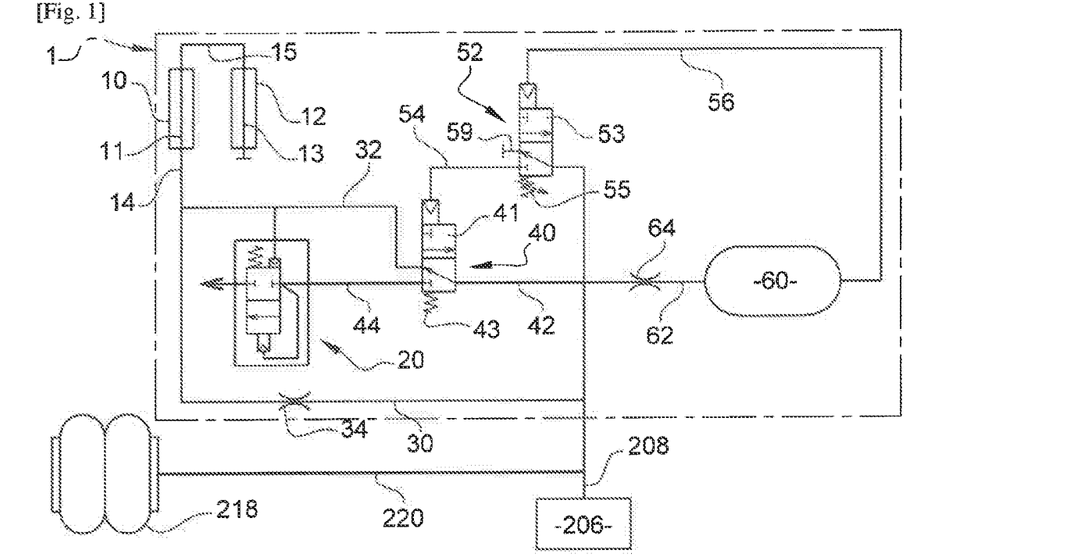
FIG. 1 is a pneumatics diagram, according to a first embodiment of the inventive subject matter, illustrating the different constituent elements, in the static state, of a rapid descent device, which is mounted on a pantograph of a railroad vehicle.
Figure 2:
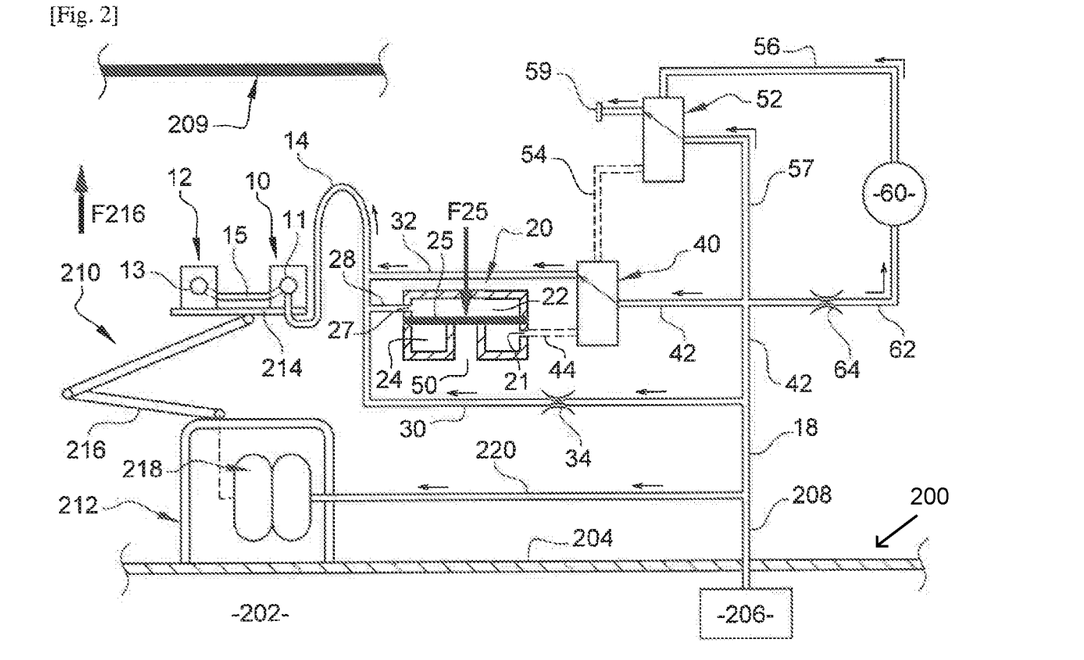
FIG. 2 is profile view, in the dynamic state, illustrating the circulation of compressed air in the rapid descent device during the initial raising of the pantograph.

FIG. 1 and FIG. 2 illustrate, respectively in the form of a pneumatics diagram and a mechanical view, a rapid descent device according to the inventive subject matter, which is labeled as a whole with reference 1 on FIG. 1. This device equips a pantograph 210, described in more detail here below, belonging to a railroad vehicle 200, represented in a schematic way in FIG. 2.

This vehicle 200 is of the traditional type in such a way that, in FIG. 2, the body 202 has only been illustrated in a partial manner, as well as its roof 204. This vehicle is moreover equipped, in a known manner, with a fluid, in particular compressed air, supply unit 206, as well as a main line, known as a supply line 208. This railroad vehicle 200 is designed to travel on a railroad track that is not represented, above which is extended an overhead line 209. This overhead line, which is partially represented, ensures in a traditional manner, the feeding of electrical current.

FIG. 2 likewise illustrates in a schematic manner the aforementioned pantograph 210, which is mounted on vehicle 200. This pantograph is designed to harness the electrical current of the overhead line 209 and, as a consequence, to feed the railroad vehicle 200 with electricity. This pantograph is likewise of a per se known type, so it is not described in detail. To start off, it comprises a chassis 212, mounted on the roof of the vehicle, as well as a current-collector bow 214 intended to come into contact with the overhead line 209.

An articulated arm 216, which links the chassis and the current-collector bow, is movable between a retracted position in which the arm is located in the vicinity of the roof, and a deployed position in which the arm ensures contact of the current-collector bow and of the overhead line. The setting into motion of the arm 216 is ensured by a deployment unit, which is typically a cushion 218. This cushion is pneumatically fed by a feeder line 220, which extends from the main line 208 mentioned here above.

The rapid descent device according to the device 1, first of all, substantially comprises at least one rub strip, a main valve, a main distributor, an intermediate distributor, and a reserve chamber. This device 1 moreover comprises different lines allowing the admission of compressed air from unit 206, as well as the circulation of compressed air between the aforementioned mechanical elements. On FIG. 1, all the mechanical elements belonging to this device are assigned numerical references which are all below the number 100.

In this embodiment, two identical rub strips 10 and 12 are provided. As a variant, however, the device 1 can be equipped with a varying number of these strips, in particular with one single rub strip. Each strip 10 and 12, which is per se of a known type, is in particular equipped with a respective circuit, called a wear detection circuit 11 and 13, illustrated in a schematic manner. The wear detection circuit is generally made up of a tube traversing the rub strip in the direction of its length. The rupture or piercing of this tube are the signaling of a worn or broken strip.

Traditionally, one end of the detection circuit 11 is fed by a line that is known as a detection line 14. On all of the FIGS. 2 to 5, for clarity, this line 14 is represented at a distance from the arm 216 of the pantograph. Nonetheless, in practice, this line is advantageously fastened along this arm 216 in a manner to adapt to variations in height of the pantograph. Moreover, the detection circuit 13 placed downstream of circuit 11, is fed fluid from the other end of the circuit 11, by connection line 15. The other end of the circuit 13 is blocked off. Each rub strip 10 and 12 is able to be fastened to the body of the current-collector bow 214, using all appropriate means.

The main valve 20 comprises two chambers, which is to say respectively a main chamber 24 and a chamber called a pilot chamber 22, which are separated by a membrane 25. The main chamber 24 is provided with an inlet aperture 21, as well as an outlet aperture 50, whereas the pilot chamber 22 is provided with an aperture called pilot aperture 27. As will be seen in the following, the membrane 25 possesses a first operational position, called the closed position, in which the membrane blocks off the outlet aperture, as well as a second operational position, called the open position, in which the membrane does not block off this aperture. In particular, in this first operational position, the membrane 25 rests upon a seat, provided in the vicinity of the outlet of the main chamber 24.

It must be underlined that in contrast with valves known from the state of the art, the membrane 25 of the valve according to the first embodiment of the inventive subject matter is lacking a calibrated aperture. Moreover, the pilot line 28 is noted, which allows for the supply of compressed air into the pilot chamber 22. This line 28 is connected to the aforementioned detection line 14. Advantageously, the respective section of these lines 14 and 28 are identical, which ensures a greater simplicity in manufacturing as well as a reduction in costs.

These lines 14 and 28 are firstly put into communication with a branch line 30, which extends from a main inlet line 18, extending from line 208 in parallel with the supply line 220. Moreover, these lines 14 and 28 are put in communication with a so-called provisional feed line 32, placed in parallel with the branch line 30.

This branch line 30 is equipped with a restriction 34, in such a manner that the passage cross-section of the branch line is calibrated, while still being clearly smaller in cross-section than those of lines 18 and 14. Moreover, line 32 advantageously presents a cross-section that is clearly larger than restriction 34, to ensure an efficient increase of the pressure in the pilot chamber during the initial phase, as will be seen in more detail here below. Furthermore, likewise in an advantageous manner, the cross-section of line 32 is smaller than that of line 44 described here below, in particular for cost reasons.

The secondary line 32 extends, on an upstream end of the secondary line, from a first outlet of the main distributor 40. In a manner that is per se known, as is shown in particular in FIG. 1, this distributor 40 comprises a distributor valve 41 mounted in a sliding fashion against a spring 43. The inlet of this distributor is formed by the downstream end of a connection line 42, which extends from the aforementioned admission line 18, advantageously presenting the same cross-section. The other outlet of the distributor 40 is formed by the upstream end of a line 44 allowing the feeding of the main chamber 24 of the valve via an inlet aperture 21. Lastly, this distributor 40 comprises a control line 54, which will be described in detail here below. Traditionally, as a function of the pressure of the fluid in this control line, the distributor valve 41 is able to take on two operational positions. This distributor valve thus ensures the selective placement in communication between, on the one hand, the connection line 42 and, on the other hand, either the secondary line 32 or the feed line 44 of the main chamber 24.

Line 44 presents a cross-section that is considerably larger than that of the line 32, described here above. In a general manner, the person skilled in the art will choose a wider cross-section for the various lines 220, 18, 42 and 44 to authorize a rapid evacuation of the air out of the cushion, during the second phase of implementation described here below. Lastly, the main chamber has an outlet aperture 50, of a per se known type, the cross-section of which is larger or equal to that that of the different lines mentioned here above.

The main distributor 40 is controlled by an intermediate distributor 52, via the aforementioned control line 54. This intermediate distributor 52 possesses a distributor valve 53, mounted in a sliding fashion against a spring 55. Traditionally, as a function of the position of this distributor valve 53, the inlet of the distributor 52, which is formed by a line 57 tapped onto the line 42, can be put into selective communication with one of the outlets of this distributor. The first outlet of this distributor is formed by the line 54, which we have seen to ensure the control of the main distributor. Moreover, the second outlet of this distributor is blocked off by a plug 59.

The control of this intermediate distributor is connected, via a control line 56, to the reserve chamber 60. This reserve chamber is fed, from line 42, by a so-called reserve line 62. This line 62 is equipped with a restriction 64, the cross-section of which is clearly smaller than that of the aforementioned line 42.

When the so-called control pressure, in the control line 56, is lesser than a first predetermined value, noted as P1, the intermediate distributor 52 is in a configuration illustrated, in particular, in FIG. 2. Then, when the control pressure becomes greater than this first value, the intermediate distributor switches in configuration that is illustrated in a schematic manner in FIG. 3. Moreover, when the control pressure drops once again, until the control pressure drops below a predetermined second value P2, the intermediate distributor 52 switches once again towards a first operational configuration of FIG. 2. By way of non-limiting examples, the second predetermined value P2 can be slightly lesser than the first predetermined value P1, to avoid unintentional phenomena of oscillation of the distributor 52.

It can be noted, that in contrast to the main distributor 40, this intermediate distributor 52 is adjustable, as embodied by the arrow associated with spring 55. As a consequence, this distributor 52 is of the pneumatic manostat type. Thus, for example, thanks to an adjustment knob, it is possible to modify the two aforementioned predetermined values, allowing for control of the distributor 52. Hysteresis, the difference in value between P1 and P2, is generally set and is not adjustable. In a manner that is known per se, it is possible to provide means of adjustment, which allow the modification of these predetermined values, independently one from the other, by combining two pneumatic manostats.

In the example described and illustrated, the respective main distributor 40 and intermediate distributor 52 are of the distributor valve type. As a non-illustrated alternative, the inventive subject matter can be applied to other types of distributors, which are known by the person skilled in the art. In a non-limiting manner, poppet valves can be named.

By way of non-limiting examples, the following numeric values are given here below:
cross-section of each line 18, 42 and 44: between 8 mm (millimeters) and 15 mm, typically close to 10 mm;
cross-section of line 32: between 4 mm and 6 mm, typically close to 4 mm;
cross-section of the restriction 34: between 0.4 mm and 1.2 mm, typically close to 0.7 mm;
cross-section of the restriction 64: between 0.2 mm and 0.7 mm, typically close to 0.4 mm;
cross-section of each line 14 and 28: between 4 mm and 6 mm, typically close to 4 mm;
volume of the reserve chamber 60: between 0.2 L (liters) and 1.0 L, typically close to 0.4 L.

Figure 3:
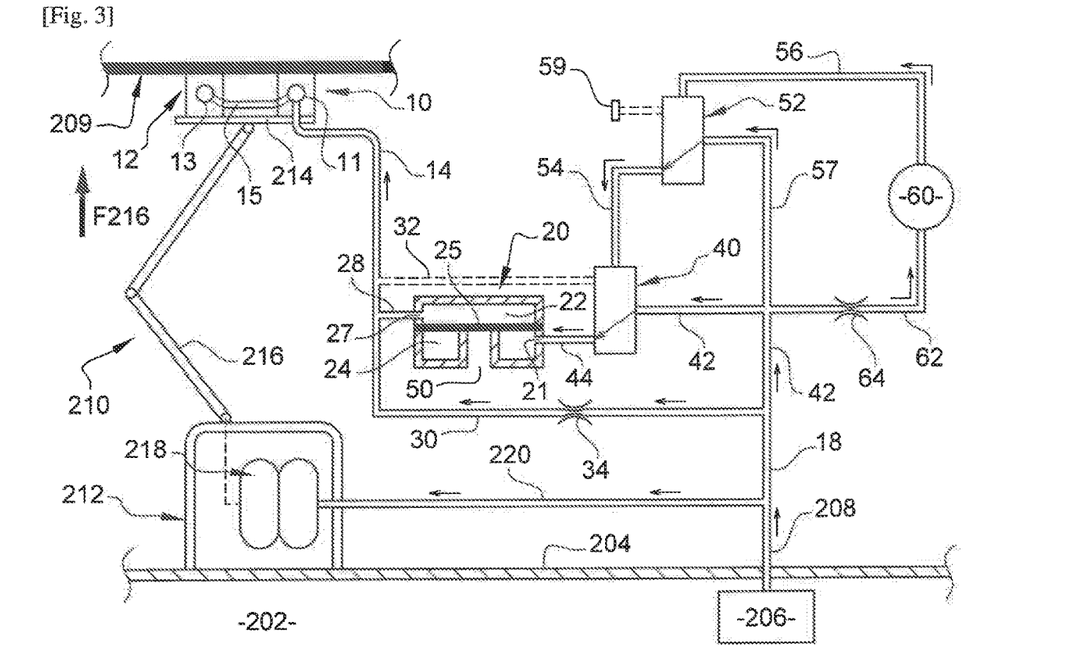
FIG. 3 is a profile view, analogous to FIG. 2, illustrating the circulation of compressed air in the rapid descent device in the framework of a normal operation of the pantograph.
Figure 4:
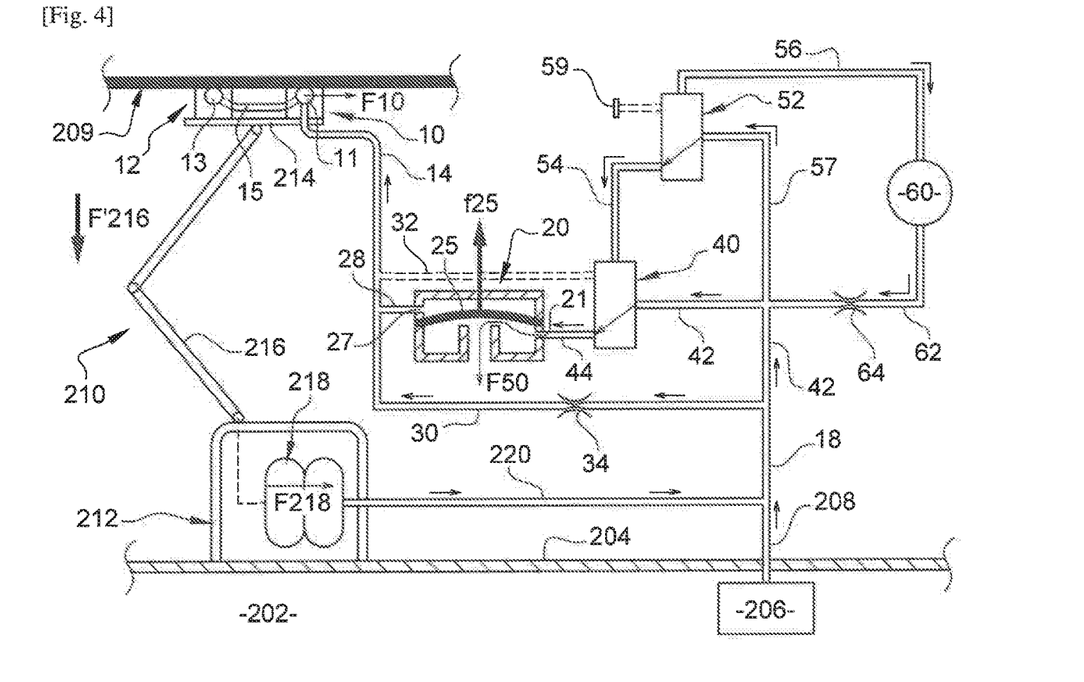
FIG. 4 is a profile view, analogous to FIG. 2, illustrating the circulation of compressed air in the rapid descent device during an emergency retraction of the pantograph.
Figure 5:
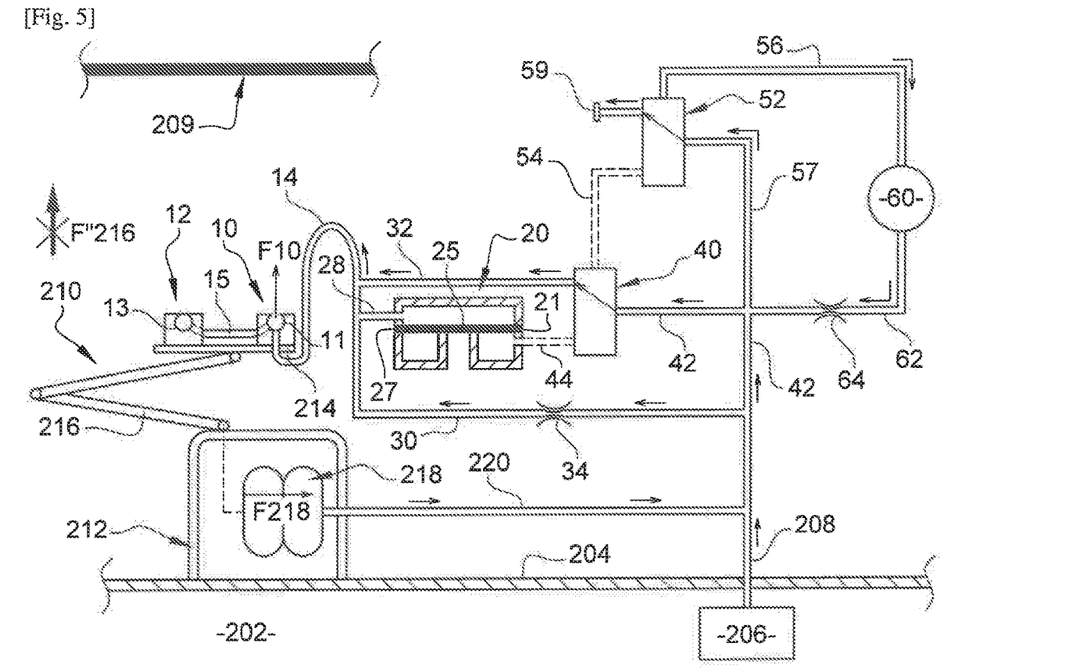
FIG. 5 is a profile view, analogous to FIG. 2, illustrating the circulation of compressed air in the rapid descent device, once the pantograph has been fully lowered.

The implementation of the aforementioned pantograph 210, equipped with the rapid descent device 1 according to the inventive subject matter, will now be described in reference to FIG. 2 and FIG. 3. In these figures, the lines, in which compressed air circulates, are shown in dotted lines. The other lines are illustrated in solid lines, the flow of compressed air in these lines being shown by arrows.

As the feed unit 206 delivers compressed air, the compressed air is admitted on the one hand in the cushion 218 and on the other hand in line 18. There is then accumulation, both in the reserve chamber 60 and in the control line 56, of this compressed air, the pressure of which progressively increases. In a first time, this compressed air pressure is lesser than the first aforementioned predetermined value P1. As a consequence, this compressed air, present at a low pressure in the control line 56, does not allow the movement of the distributor valve 53. Under these conditions, the inlet line 57 is blocked off by the plug 59.

The other outlet line 54, forming, as has been seen here above, the control of the main distributor, is therefore not fed fluid. Thus, the distributor valve 41 of the main distributor 40 is kept in its position of FIG. 2. As a consequence, the compressed air is solely admitted in the pilot chamber 22. The distributor 40 therefore finds itself in its first operational position, called the temporary shut out position, in which it shuts out the line 44 feeding the main chamber 24. This phase of temporary shut out also corresponds to a phase, called provisional, of compressed air feeding of line 32 feeding pilot chamber 22.

Thus, according to the inventive subject matter, in this first phase of raising of the pantograph, the pilot chamber is found to be quickly filled thanks to the aforementioned secondary line 32. The same is to be compared with the already cited prior art, in which the pilot chamber is slowly filled through a small-diameter calibrated hole supplied in the membrane. In this vein, it shall be noted that thanks to the inventive subject matter, the secondary line 32 is able to have a diameter that is quite a bit larger than that of the calibrated hole, which allows the much faster filling of the pilot chamber.

The prevailing pressure in this pilot chamber 22 is then clearly higher than that prevailing in the main chamber 24. This thus allows for the firm pinning of the membrane 25 on its seat, which is embodied by arrow F25 on this FIG. 2. On the other hand, in contrast with prior art, the main chamber not being fed fluid, the fluid feeding the deployment cushion cannot escape by the valve. The raising of the pantograph is thus implemented in a reliable manner since the cushion is fed compressed air at a sufficient pressure on a permanent basis.

Upon conclusion of the phase of initial raising, embodied by the arrow F216 in FIG. 2, the articulated arm reaches a deployed position so as to place the rub strips 10 and 12 in contact with the overhead line. This deployed position is, in particular, illustrated in FIG. 3. In parallel, the compressed air pressure in the control line 56 continues to increase, until the air pressure exceeds the aforementioned first predetermined value P1. As a consequence, the distributor valve 53 of the intermediate distributor 52 slides, so as to henceforth put the inlet line 57 in communication with the control line 54. The compressed air, henceforth circulating in this line 54, brings about the effect that the air, in turn, displaces the distributor valve 41 of the main distributor 40. The main distributor is in a second operational position, called supply position, in which the main distributor allows the supply of compressed air in the direction of the main chamber 24.

The compressed air then flows in the line 44 in the direction of the main chamber 24, whereas the pilot chamber 22 is solely fed by the branch line 30, the flow rate of which is limited by the restriction 34. This latter line 30 can compensate for possible minor leakages of the circuit for detection of wear of the strips, which is to say, tubes 11 and 13, pilot chamber 22, and the associated lines. In prior art cited in the introduction of this description, the calibrated hole of the membrane does certainly achieve this function. Nonetheless, the hole must also allow the initial filling of the detection circuit.

It can therefore be considered that the diameter of the calibrated hole is the result of a compromise between the speed of filling and the detection sensitivity of a leakage of tube 11 or 13, due to wear of strip 10 or 12. A larger diameter does certainly allow the rapid filling of the detection circuit, thereby ensuring the raising of the pantograph. This efficient raising, however, is accompanied by an important loss in detection sensitivity. In contrast, an overly small diameter does not allow for a sufficiently fast filling of the pilot chamber, which will therefore not be able to oppose the force brought about by the pressure in the main chamber, making the raising of the pantograph impossible.

The inventive subject matter advantageously presents a decoupling between, on the one hand, the filling of the detection circuit achieved by the secondary line 32 and, on the other hand, the compensation of possible minor leakages that is authorized by the branch line 30 supplied with restriction 34. As a consequence, thanks to the inventive subject matter, the diameter of the restriction 34 can advantageously be smaller than that of the calibrated hole of the membrane provided in prior art, which thereby offers a better sensitivity of detection of wear of the strips.

The pilot chamber 22 is filled prior to the main chamber 24, whereas the membrane moreover possesses a surface, facing the pilot chamber, that is larger than that facing the main chamber. As a consequence, the exertion applied on the membrane in the pilot chamber is always greater than that which is applied on the membrane in the main chamber, corresponding to the aforementioned arrow F25. It thereby results that the outlet aperture of the main chamber is constantly kept closed, thanks to the firm pinning of the membrane against the seat. Thus, during the complete raising of the pantograph, the inventive subject matter allows for the substantially total suppression of the leaks observed at the outlet aperture 50 in prior art.

It will be noted that the use of the intermediate distributor 52 allows for the temporary shifting of the passage of the main distributor 40, from a shut out position towards a supply position, in relation to the occurrence of an event that is representative of a deployment of the pantograph. In the illustrated example, this event corresponds to the moment in which the supply means 206 start to supply fluid. As a variant, this event can correspond to the moment in which the pantograph leaves a low position. For example, a cam fitted on the articulation axis between the lower arm and the chassis 212 controls the main distributor 40 in a supply position, when the pantograph reaches a height that is determined by the cam. In this case, the distributor 40 then has a mechanical control available instead of a pneumatic control. The intermediate distributor, the reserve chamber 60, and the associated lines are then optional.

In the case of critical wear of one of the rub strips 10 and 12, the tube inserted in the rub strip is pierced and thereby brought to atmospheric pressure in a manner known per se. It can, for example, be the strip 10, which is shown by arrow F10 in FIG. 4. As a consequence, the pilot chamber 22 is substantially no longer fed compressed air since the air supplied by the branch line 30 equipped with restriction 34 is not sufficient to compensate for the leakage at the strip. The pressure of the main chamber 24 then exercises a greater force than that of the pilot chamber. As a consequence, membrane 25 rises according to arrow F25 in FIG. 4, in such a manner that the compressed air evacuates by aperture 50 of the valve 20 according to arrow F50. The cushion 218 is therefore brought to atmospheric pressure, which is shown by arrow F218. This causes articulated arm 216 to descend, according to arrow F216 in the same FIG. 4.

In parallel, the air evacuates from the reserve chamber 60. Given the presence of the very small cross-section restriction 64, however, this evacuation takes place at a very weak flow rate, so that the pressure in the control line 56 diminishes very slowly. Under these conditions, the intermediate distributor 52 does not immediately return to its initial configuration shown in FIG. 2. Incidentally, the main distributor 40 also does not return to a shut out configuration, represented in the same FIG. 2.

In other words, there is a temporal shift between, on the one hand, the occurrence of an event that is representative of the retraction of the pantograph and, on the other hand, the return of the distributor to a shut out configuration. In the illustrated example, this event corresponds to when the rub strip is brought to atmospheric pressure. Nonetheless, as a variant, it is possible to provide that this event corresponds to the moment in which the pantograph returns to a low position. For example, a cam fitted on the articulation axis between the lower arm and the chassis 212 controls the main distributor 40 into a shut out position when the pantograph returns below a height determined by the cam. In this case, the distributor 40 then has a mechanical control instead of a pneumatic control available; the intermediate distributor, the reserve chamber 60, and the associated lines no longer being necessary.

Lastly, once the pressure in chamber 60 and in control line 56 has substantially diminished, distributor 52 returns in an initial configuration shown in FIG. 2. As a consequence, the main distributor 40 is switched to an initial shut out configuration. As is evident from the above, this switching takes place following a major evacuation of air from the cushion provoking a descent of the pantograph to the initial position. We will moreover underline that, in this configuration, the articulated arm cannot raise anew. Indeed, since the strips 10 and 12 are still at atmospheric pressure, the same also applies to the cushion, the pressure of which cannot as a consequence increase. Under these conditions, this cushion cannot fulfill its function of deployment of the arm, as is embodied by the crossed-out arrow F"216 in FIG. 5.

This is especially advantageous, since this prevents the current-collector bow, equipped with the henceforth defective rub strips, from coming into contact with the overhead line. Thus, the inventive subject matter makes it possible to avoid any risk of this current-collector bow snagging with the overhead line and more in general, of any deterioration of the overhead line.

Figure 6:
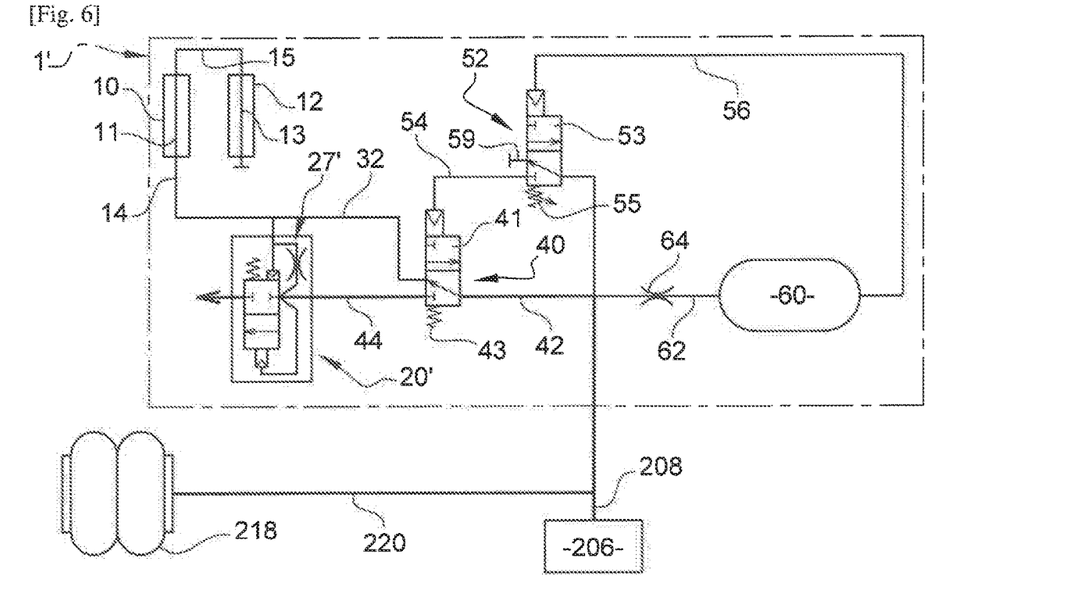
FIG. 6 is a pneumatics diagram analogous to FIG. 1, illustrating a rapid descent device according to a second embodiment of the inventive subject matter.
Figure 7:
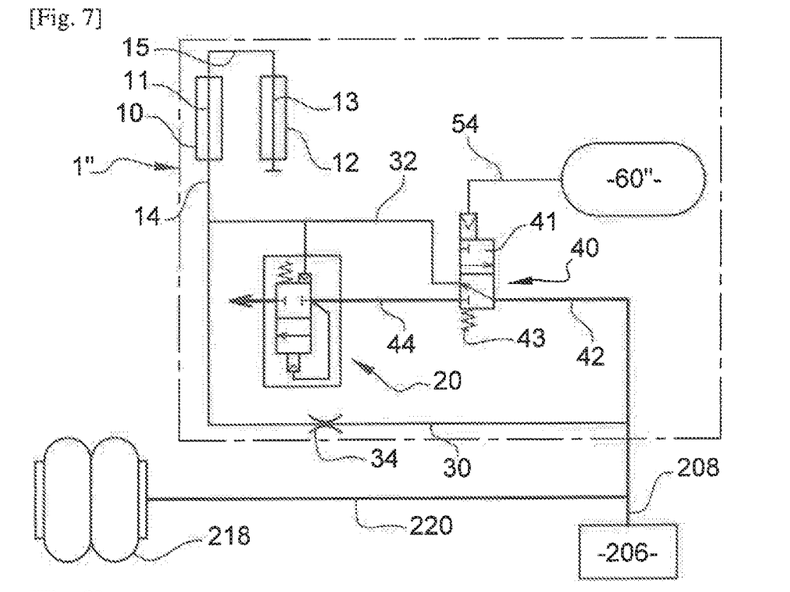
FIG. 7 is a pneumatics diagram analogous to FIG. 1, illustrating a rapid descent device according to a third embodiment of the inventive subject matter.
Figure 8:
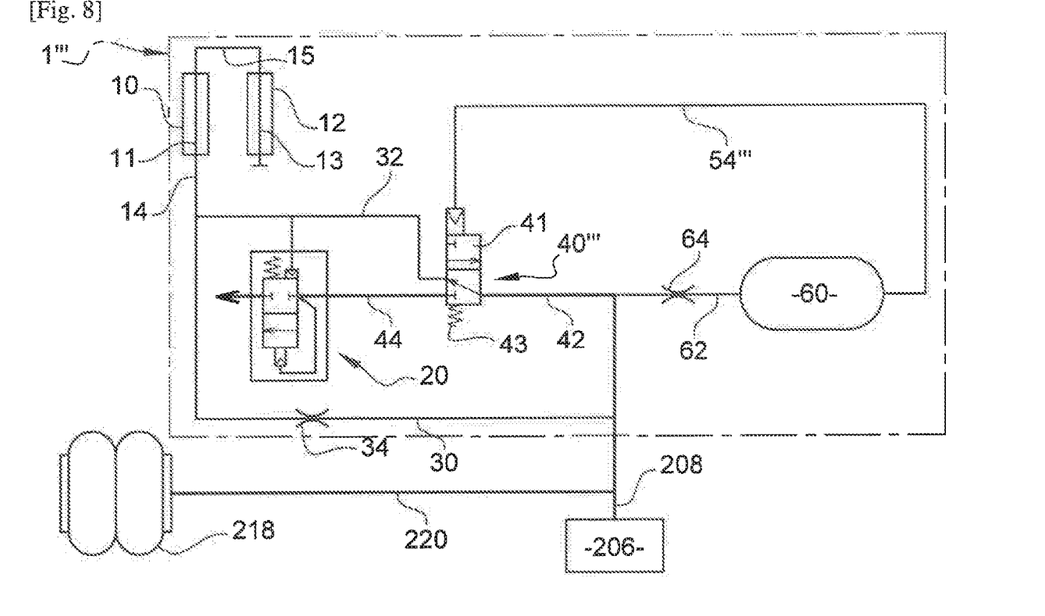
FIG. 8 is a pneumatics diagram analogous to FIG. 1, illustrating a rapid descent device according to a fourth embodiment of the inventive subject matter.

FIGS. 6 to 8 illustrate three embodiments of the inventive subject matter. On FIG. 6 to FIG. 8, mechanical elements that are identical to those of FIG. 1 to FIG. 5 have the same reference numbers, with only the different mechanical elements being assigned a suffix "first" ('), "second" (") and "third" (''').

Device 1' of FIG. 6 differs from that of the preceding figures, in particular, in that the device is lacking the branch line 30 equipped with the restriction 34. In contrast with device 1 of FIG. 1 to FIG. 5, the membrane 25 of the valve 20' is pierced by an aperture 27', like in the state of the art. By way of example, the cross-section of this aperture 27' measures between 0.7 mm and 1.2 mm.

The implementation of the rapid descent device 1', according to the variant of FIG. 6, is overall analogous to that of the previously described device 1. It will however be noted that this variant of FIG. 6 is less preferable than the main implementation of FIG. 1 to FIG. 5. Indeed, during the implementation of device 1 shown in these figures, the distributors 40, 52 and the valve 20 are preferably mounted on a per se known pneumatic plate. Typically, this plate is in the form of a metallic block in which are implemented, using all appropriate means, the lines 18, 28, 30, 32, 42, 44, 54, 56, 57, 62, the restrictions 34, 64 as well as the reserve chamber 60.

This pneumatic plate allows for a greater reliability of the system since the plate reduces the risk of leaks by limiting the number of couplings. The plate also allows for a reduction in the cost price of the rapid descent system. The use of a valve without a membrane pierced by a calibrated hole contributes to a greater reliability at a lesser price. However, this variant allows for a refurbishment at a lesser cost than a pantograph equipped with a rapid descent device according to the state of the art by re-using valve 20'.

Device 1" of FIG. 7 differs from that of the preceding figures, in particular in that the device is lacking a reserve chamber, as well as reserve line and the intermediate distributor which are associated with it in the first main embodiment. A retarder 60", of any appropriate type, is illustrated in a schematic manner in this FIG. 7.

During operation, it is firstly assumed that the distributor 40 is in an active position, analogous to that of FIG. 2, which allows for the pantograph to be raised as described here above. The retarder is able to make this distributor pass to the inactive position at the end of a predetermined period of time, which is typically between 6 and 10 seconds. Moreover, in the case of one of the rub strips being exposed to the atmosphere, this retarder 60" is able to temporarily shift the return of the distributor, to the active position. Typically, a period of time of between 6 and 10 seconds is observed starting from the moment of exposure to the atmosphere before switching the distributor into its active position.

The retarder 60" can be of the mechanical type, such as, for example, a cam that is mounted on the articulation axis between the lower arm and the chassis 212 which controls the main distributor 40, in a supply position when the pantograph reaches a determined height by the cam, in a shut out position when the pantograph returns below a height determined by the cam. The distributor 40 then has a mechanical control available to the distributor instead of a pneumatic control. Even if the cam determines a pantograph height, this height corresponds to a determined temporal shift since the fluid supply unit is generally equipped with a flow rate regulator.

As a variant that is not illustrated, it is also possible to combine the variants of FIG. 6 and FIG. 7. In other words, in this additional variant, the membrane is pierced by an aperture like 27' of FIG. 6, whereas the device is equipped with a retarder that is analogous to that of 60" in FIG. 7.

In the embodiment represented in FIG. 8, the two distributors 40 and 52 are advantageously replaced by a single distributor 40''', the control values P1 and P2 of which are previously set by construction. This variant, which is advantageous from a financial point of view, can be envisaged, in particular, when the pilot pressure is known. This embodiment of FIG. 8 can thus lend itself to large-scale industrialization, in particular, when the embodiment is combined with the aforementioned pneumatic plate.

The rapid descent device, according to the inventive subject matter, can firstly be installed on an original equipment pantograph. As an alternative, the device can also equip an already existing pantograph. In this spirit, this existing pantograph can initially be lacking a rapid descent device. Such a pantograph can likewise be equipped with a used rapid descent device, in particular, one according to the state of the art, in which case the device according to the inventive subject matter then replaces this used device.

The inventive subject matter is not limited to the examples described and represented.

Thus, in the embodiments here above, the temporary shut out phase of the distributor 40 is simultaneous with the provisional feeding phase, by line 32. As a variant, it is nonetheless possible to provide a shift between this temporary shut out and this provisional feeding. In particular, the start of the provisional feeding phase can be shifted in time according to predetermined time period, in relation to the start of the temporary shut out phase.

In the aforementioned embodiments, the valve 20, the membrane 25 of which is lacking the aperture, is combined with the means of temporary shut out of the supply of fluid of the main chamber. However, as a variant that is not represented, it is possible to provide that such a valve, the membrane of which does not present an aperture, can be implemented in a rapid descent device which does not have such temporary shut out means.

What is claimed is:

1. A rapid descent device for a pantograph equipped on a vehicle, the pantograph comprising a chassis, a current-collector bow configured to be placed against an overhead line, an articulated arm linking the current-collector bow to the chassis, and a deployment unit connected to the articulated arm and in fluid communication with a fluid supply unit configured to supply a compressed fluid, the rapid descent device comprising:
a valve comprising a pilot chamber and a main chamber, which are separated by a membrane, the pilot chamber comprising a pilot aperture of the valve, the main chamber comprising an inlet aperture and an outlet aperture, the outlet aperture allowing evacuation of the compressed fluid to the atmosphere, the membrane movable between a closed position, in which the membrane plugs the outlet aperture, and an open position, in which the membrane does not plug the outlet aperture;
a rub strip configured to be fastened to the current-collector bow, the rub strip configured to contact the overhead line, the rub strip equipped with a degradation detection circuit, configured to be supplied the compressed fluid;
a supply line fluidly connected to the fluid supply unit and configured to supply the compressed fluid to the main chamber through the inlet aperture;
at least one feeder line fluidly connected to the fluid supply unit and configured to feed the compressed fluid to the pilot chamber; and
a detection line that extends from the pilot chamber of the valve to the degradation detection circuit of the rub strip,
the rapid descent device comprising means for temporary shut out of flow of the compressed fluid to the main chamber.

2. The rapid descent device of claim 1, wherein the membrane of the valve lacks an aperture.

3. The rapid descent device of claim 1, wherein the means for temporary shut out are configured to block the supply line.

4. The rapid descent device of claim 1, wherein the at least one feeder line includes a provisional feed line, and the rapid descent device further comprises provisional fluid feed means for supplying the compressed fluid to the pilot chamber of the valve, the provisional fluid feed means being provisional opening means of the provisional feed line which links the provisional opening means and to the pilot aperture of the valve.

5. The rapid descent device of claim 4, wherein the means for temporary shut out and the provisional opening means comprise a main distributor, main distributor configured to link the fluid supply unit to the provisional feed line in a first distribution position, and to the supply line in a second distribution position.

6. The rapid descent device of claim 5, further comprising first means of temporal shift configured to shift the main distributor from the first distribution position to the second distribution position in response to occurrence of an event that is representative of deployment of the pantograph, wherein the event that is representative of the deployment of the pantograph comprises one of a moment in which the fluid supply unit begins to supply the compressed fluid or a moment in which the pantograph leaves a retracted position.

7. The rapid descent device of claim 6, further comprising a second means of temporal shift configured to shift the main distributor from the second distribution position to the first distribution position in response to occurrence of an event that is representative of retraction of the pantograph, wherein the event that is representative of the retraction of the pantograph comprises one of a moment the rub strip is exposed to atmospheric pressure or a moment in which the pantograph returns to the retracted position.

8. The rapid descent device of claim 7, wherein the first means of temporal shift and the second means of temporal shift are common means of temporal shift.

9. The rapid descent device of claim 8, wherein the common means of temporal shift comprise:
a reserve chamber;
a reserve line fluidly connecting the fluid supply unit to the reserve chamber, the reserve line including a cross-sectional restriction; and
control means configured to position the main distributor in the first distribution position when pressure in the reserve chamber is less than a first set value, and to position the main distributor in the second distribution position when the pressure in the reserve chamber is greater than a second set value.

10. The rapid descent device of claim 9, wherein the control means comprises a main control line that fluidly connects the reserve chamber to a control inlet of the main distributor.

11. The rapid descent device of claim 10, wherein the control means comprises an intermediate distributor, the main control line extending from an outlet of the intermediate distributor, the intermediate distributor fluidly connected to the reserve chamber via an intermediate control line.

12. The rapid descent device of claim 1, wherein the at least one feeder line includes a branch feed line fluidly connected to the pilot aperture of the valve, the branch feed line configured to receive the compressed fluid from the fluid supply unit, the branch line including a restriction, wherein a cross-section of the restriction is smaller than a cross-section of the detection line.

13. A pantograph comprising the rapid descent device of claim 1, wherein the pantograph comprises a chassis, a current-collector bow configured to be placed against an overhead line, an articulated arm linking the current-collector bow to the chassis, and a deployment unit connected to the articulated arm and in fluid communication with a fluid supply unit configured to supply a compressed fluid.

14. A vehicle comprising a roof and the pantograph of claim 13, the chassis of the pantograph being fastened to the roof of the vehicle.

15. A method of implementing the pantograph of claim 13, wherein temporary shut out means are configured to be placed in a shut out configuration to deploy the articulated arm and to put the rub strip in contact with the overhead wire, and the temporary shut out means are configured to transition to a supply configuration, subsequent to occurrence of an event that is representative of deployment of the pantograph, wherein the event representative of the deployment of the pantograph comprises one of a moment in which the fluid supply unit starts to supply the compressed fluid or a moment in which the pantograph leaves a retracted position.

16. The method of claim 15, wherein the temporary shut out means is configured to transition from the supply configuration to the shut out configuration subsequent to occurrence of an event that is representative of retraction of the pantograph, wherein the event representative of the retraction of the pantograph comprises one of a moment in which the rub strip is exposed to atmospheric pressure or a moment in which the pantograph returns to the retracted position.

17. A method comprising:
installing the rapid descent device of claim 1 on a pantograph configured to be equipped on a vehicle, wherein the pantograph comprises a chassis, a current-collector bow configured to be placed against an overhead line, an articulated arm linking the current-collector bow to the chassis, and a deployment unit connected to the articulated arm and in fluid communication with a fluid supply unit configured to supply a compressed fluid.

18. A system for a pantograph, comprising:
a rub strip configured to be fastened to a pantograph and to contact an overhead line, the rub strip equipped with a degradation detection circuit configured to be supplied a compressed fluid;
a valve comprising a pilot chamber and a main chamber, which are separated by a membrane, the pilot chamber comprising a pilot aperture of the valve, the main chamber comprising an inlet aperture and an outlet aperture of the valve, the membrane movable between a closed position, in which the membrane plugs the outlet aperture, and an open position, in which the membrane does not plug the outlet aperture, allowing evacuation of the compressed fluid from the valve to the atmosphere;
a supply line configured to be fluidly connected to a fluid supply unit and to supply the compressed fluid to the main chamber of the valve through the inlet aperture;
at least one feeder line configured to be fluidly connected to the fluid supply unit and to feed the compressed fluid to the pilot chamber; and
a detection line that extends from the pilot chamber of the valve to the degradation detection circuit of the rub strip.

19. The system of claim 18, further comprising a main distributor configured to provide temporary shut out of flow of the compressed fluid to the main chamber of the valve, the main distributor operable in a first distribution position and a second distribution position, wherein the main distributor in the first distribution position is configured to establish a first flow path from the fluid supply unit to one of the feeder lines for supplying the compressed fluid to the pilot chamber of the valve, and the main distributor in the second distribution position is configured to establish a second flow path from the fluid supply unit to the supply line for supplying the compressed fluid to the main chamber of the valve.

20. The system of claim 18, wherein the membrane of the valve lacks an aperture.

* * * * *